US011402840B2

(12) United States Patent
Danford

(10) Patent No.: US 11,402,840 B2
(45) Date of Patent: Aug. 2, 2022

(54) INDEPENDENT TRAJECTORY VALIDATION SYSTEM FOR VEHICLES

(71) Applicant: Woven Planet North America, Inc., Los Altos, CA (US)

(72) Inventor: Kevin Danford, San Francisco, CA (US)

(73) Assignee: Woven Planet North America, Inc., Los Altos, CA (US)

(*) Notice: Subject to any disclaimer, the term of this patent is extended or adjusted under 35 U.S.C. 154(b) by 117 days.

(21) Appl. No.: 16/917,562

(22) Filed: Jun. 30, 2020

(65) Prior Publication Data
US 2021/0405642 A1 Dec. 30, 2021

(51) Int. Cl.
G05D 1/02 (2020.01)
G01C 21/34 (2006.01)
G01C 21/36 (2006.01)
B62D 15/02 (2006.01)
G06V 20/56 (2022.01)

(52) U.S. Cl.
CPC ......... *G05D 1/0212* (2013.01); *B62D 15/021* (2013.01); *G01C 21/3469* (2013.01); *G01C 21/367* (2013.01); *G06V 20/56* (2022.01); *G05D 2201/0213* (2013.01)

(58) Field of Classification Search
CPC ......... G05D 1/0212; G05D 2201/0213; B62D 15/021; G01C 21/3469; G01C 21/367; G06K 9/00791
See application file for complete search history.

(56) References Cited

U.S. PATENT DOCUMENTS 9,555,740 B1   1/2017 Zhu et al.
9,612,123 B1*  4/2017 Levinson ............... G01C 21/32
9,921,065 B2*  3/2018 Brannstrom ......... G05D 1/0274
(Continued)

FOREIGN PATENT DOCUMENTS

KR   20150012799 A   2/2015
WO    2018039592 A1   3/2018

OTHER PUBLICATIONS

International Searching Authority, International Search Report and Written Opinion, PCT/US2021/028923, dated Jul. 30, 2021.

*Primary Examiner* — Rami Khatib
(74) *Attorney, Agent, or Firm* — Christopher G. Darrow; Darrow Mustafa PC

(57) ABSTRACT

A method includes receiving, by a computing system of a vehicle, a planned trajectory for the vehicle based on first sensor data associated with an external environment. The planned trajectory is generated by a primary computing system associated with a first sensor. The method further includes determining an environmental condition associated with the external environment. The environmental condition is included in second sensor data generated by a second sensor. The method further includes analyzing one or more parameters associated with the planned trajectory to determine whether the planned trajectory is based on the environmental condition, and, in response to determining that the primary computing system fails to base the planned trajectory upon the environmental condition, altering the one or more parameters associated with the planned trajectory to generate an altered planned trajectory. The method thus includes instructing the vehicle to execute the altered planned trajectory.

20 Claims, 9 Drawing Sheets

(56) References Cited

U.S. PATENT DOCUMENTS

| | | |
|---|---|---|
| 2008/0159620 A1 | 7/2008 | Camus et al. |
| 2015/0032319 A1* | 1/2015 | Kim .................... G05D 1/0214 |
| | | 701/23 |
| 2018/0196437 A1 | 7/2018 | Herbach et al. |
| 2020/0406907 A1* | 12/2020 | Omari .................. G05D 1/0212 |
| 2021/0133466 A1* | 5/2021 | Gier .................... B60W 60/001 |

* cited by examiner

INDEPENDENT TRAJECTORY VALIDATION SYSTEM FOR VEHICLES

TECHNICAL FIELD

This disclosure relates generally to a system for vehicles, and, more specifically, to an independent trajectory validation system for vehicles.

BACKGROUND

Autonomous or semi-autonomous vehicles may allow for the function of a human driver to be supplemented or completely replaced by one or more computer-based driving systems. Thus, as it may be appreciated, autonomous or semi-autonomous vehicles may typically rely upon on a collection of sensors for determining an operational design domain (ODD), or an environment in which the autonomous or semi-autonomous vehicle may be optimally and safely deployed. For example, in order to safely and efficiently navigate the world, an autonomous or semi-autonomous vehicle has to accurately perceive any obstructions that may become apparent within its drive path. This may include, for example, cars, pedestrians, cyclists, traffic lights, and traffic signs. Thus, the collection of sensors of the computer-based driving system may be relied upon to operate in real-time and with high fidelity and precision. However, in certain instances, some objects may be possibly obscured from the collection of sensors of the computer-based driving system due to, for example, one or more transient system and/or environmental occurrences.

DESCRIPTION OF EXAMPLE EMBODIMENTS

Figure 1:
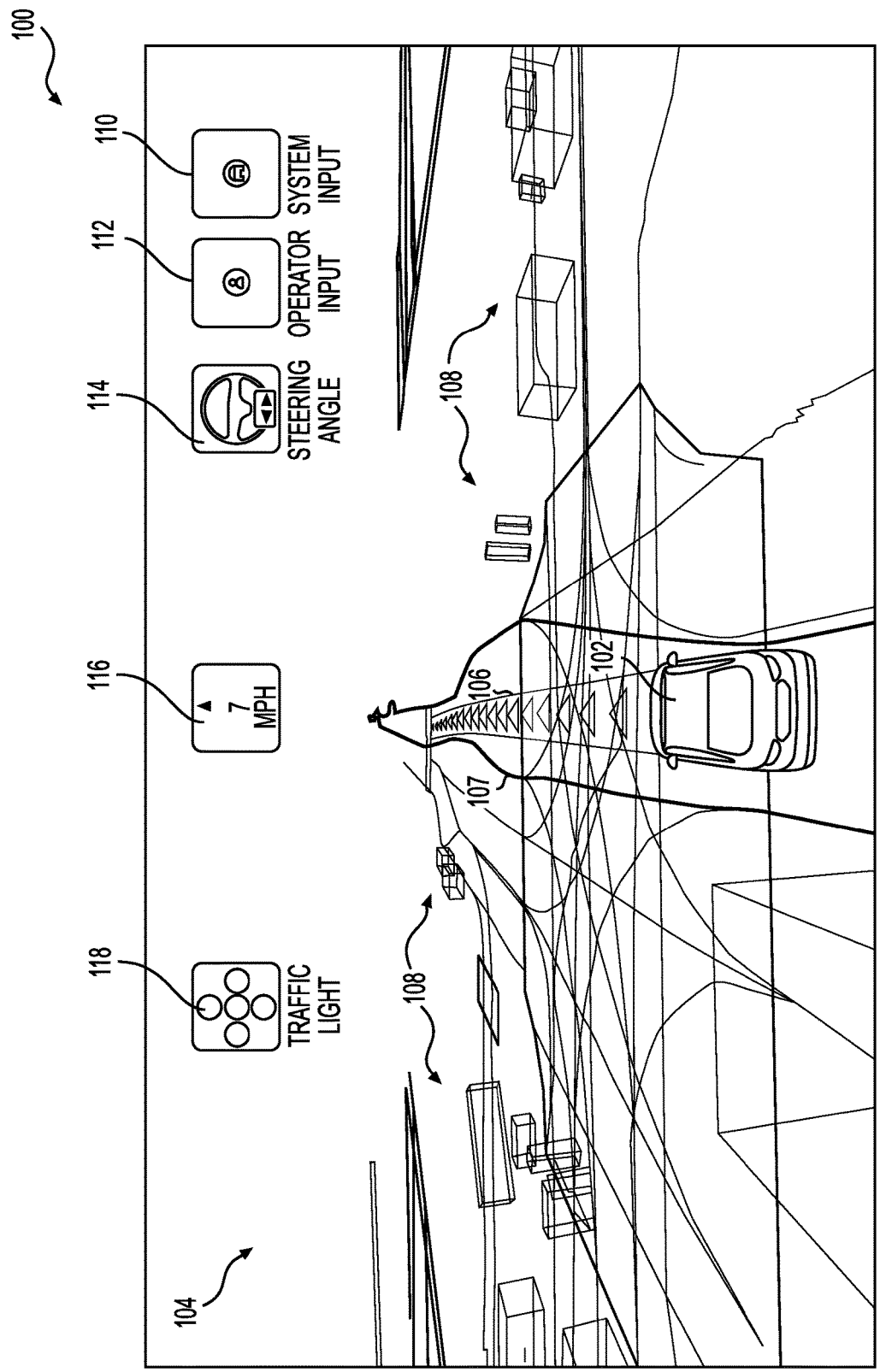
FIG. 1 illustrates an example trajectory generating and modeling system.

Autonomous or semi-autonomous vehicles may allow for the function of a human driver to be supplemented or completely replaced by one or more computer-based driving systems. Thus, as it may be appreciated, autonomous or semi-autonomous vehicles may typically rely upon on a number of sensors for determining an operational design domain (ODD), or an environment in which the autonomous or semi-autonomous vehicle may be optimally and safely deployed. For example, the particular sensors determined to be suitable for the ODD may be selected and included as part of a dedicated sensor setup installed on the vehicle. Indeed, in order to safely and efficiently navigate an environment, an autonomous or semi-autonomous vehicle has to accurately perceive any obstructions that may become apparent within its drive path. This may include, for example, moving objects such as other vehicles, pedestrians, and cyclists, as well as stationary objects such as debris, construction paraphernalia, traffic lights, and traffic signs. Thus, the perception sensor suite of the more robust primary compute system may be relied upon to operate in real-time and with high fidelity, precision, and recall. However, in certain instances, some objects may be possibly obscured from the perception sensor suite of the robust primary compute system due to, for example, one or more transient system and/or environmental occurrences.

For example, in some instances, certain objects may be improperly classified (e.g., a yield sign may be misclassified as a stop sign, a stationary object may be misclassified as moving object, a yellow traffic light may be misclassified as a red light, road debris may be misclassified as an active object such as a cyclist, and so forth) by the perception sensor suite of the robust primary compute system due to, for example, one or more transient system occurrences, such as routine mapping updates, and/or one environmental occurrences, such as morning fog, dreary mist, or other similar undesirable road conditions. Similarly, in the instance in which the sensors corresponding to the robust primary compute system include, for example, one or more radar sensors relied upon for object detection, the radar sensors may be susceptible to becoming "dirty" due to, for example, certain atmospheric conditions (e.g., fog, dew, pollen, muddy or unsurfaced roads, and so forth) and/or weather conditions (e.g., rainstorms, snowstorms, sandstorms, and so forth) during operation of the autonomous or semi-autonomous vehicle. Similarly, in other instances, in which the sensors corresponding to the robust primary compute system include, for example, one or more particular cameras relied upon for determining red lights and/or stop signs, the cameras may be less precise when the autonomous or semi-autonomous vehicle is operating during, for example, twilight or nightfall. Still, in some instances in which, for example, a highway detour within the environment in which the autonomous or semi-autonomous vehicle is operating (e.g., urban environment) has been recently constructed, for example, certain maps generated and relied upon by the robust primary compute system may not be immediately updated with respect to the recent detour within the environment. It may be thus useful to provide a simplified secondary compute system for independently validating a planned trajectory of the robust primary compute system in autonomous or semi-autonomous vehicles, in which the simplified secondary compute system may operate as an independent failsafe compute system (e.g., independent of the primary compute system) and additional safety mechanism should one or more or more objects be misclassified or generally obscured from the perception sensor suite of the robust primary compute system.

Accordingly, the present embodiments are directed to an independent trajectory validation system including a simplified secondary compute system (e.g., a failsafe compute system) for independently validating the planned trajectory of the robust primary compute system in an autonomous or semi-autonomous vehicle. In certain embodiments, the simplified secondary compute system may receive from the robust primary compute system a planned trajectory for the vehicle based on first sensor data associated with an external environment. The first sensor data may be generated by one or more primary sensors of the vehicle. For example, in some embodiments, the simplified secondary compute system may receive a planned trajectory (e.g., the real-time or near real-time plan of a vehicle as the vehicle moves from one state, position, or destination to the next) generated by the robust primary compute system based on the first sensor data (e.g., more complex and/or comprehensive 3-dimensional (3D) data). The first sensor data may include, for example, perception data captured by one or more combinations of LiDAR sensors, cameras, radars, inertial measurement units (IMUs), or other similar sensor devices that may be utilized to monitor an environment surrounding the vehicle.

In certain embodiments, the simplified secondary compute system may then determine an environmental condition associated with the external environment. The environmental condition may be included in second sensor data generated by one or more secondary sensors of the vehicle. For example, in some embodiments, the simplified secondary compute system may determine an environmental condition (e.g., moving objects such as other vehicles, pedestrians, and cyclists; stationary objects such as road debris, construction paraphernalia; road and traffic communications such as traffic lights, traffic signs, lane markings, lane boundaries, detours, school zones, railroad crossings; road and traffic conditions; weather conditions; atmospheric conditions; and so forth) based on an indication received from a simplified secondary compute system.

In certain embodiments, the simplified secondary compute system may then receive secondary sensor data generated by one or more secondary sensors of the vehicle. For example, in some embodiments, the one or more secondary sensors may include sensors that may be less complex and fewer sensors and predesignated sensors (e.g., image sensors, ultrasonic sensors, infrared sensors, RF sensors predesignated to perform only object detection) that may be utilized to detect potential hazards based on environmental conditions and independently of the more complex primary sensors. Indeed, in one embodiment, the secondary sensors corresponding to the simplified secondary compute system may be provided to support only the detection of environmental conditions, while the primary sensors corresponding to the robust primary compute system may be provided to support more complex operations such as, perception, classification, and prediction of one or more environmental conditions.

In certain embodiments, the simplified secondary compute system may then analyze one or more parameters associated with the planned trajectory to determine whether the planned trajectory is based on the environmental condition. For example, in some embodiments, the simplified secondary compute system may analyze and ascertain the planned trajectory of the vehicle (e.g., beforehand) based on one or more numerical measurement parameters (e.g., vehicle velocity, vehicle steering angle, a vehicle acceleration, a vehicle positioning parameter, a vehicle throttle position, a vehicle torque, a vehicle fuel range, a vehicle charge range, a vehicle clutch engagement and/or disengagement, a vehicle driving mode, a vehicle air-to-fuel ratio, a vehicle altitude, and so forth) associated with the planned trajectory. In certain embodiments, in response to determining by the simplified secondary computing system that the first computing system fails to base the planned trajectory upon the environmental condition, the simplified secondary compute system may then alter the one or more parameters associated with the planned trajectory to generate an altered planned trajectory.

For example, in some embodiments, in response to determining the environmental condition associated with the external environment, the simplified secondary computing system may query the planned trajectory for the numerical measurement parameters to determine, based on the numerical measurement parameters and/or kinematic measurement parameters, whether the planned trajectory satisfies a confidence threshold. When the simplified secondary compute system determines the planned trajectory as failing to satisfy the confidence threshold, the simplified secondary compute system may proceed in altering the numerical measurement parameters (e.g., change of vehicle velocity, change of vehicle steering angle, change of vehicle acceleration, change of vehicle positioning, change of vehicle throttle position, change of vehicle torque, engage a disengage a vehicle clutch, change of vehicle driving mode, and so forth) associated with the planned trajectory to generate an altered planned trajectory. Specifically, by altering the numerical measurement parameters and/or kinematic measurement parameters, the simplified secondary compute system may generate an altered planned trajectory, and, by extension, one or more altered driving maneuvers (e.g., a yield, a complete stop, an abrupt stop, a moving stop, an acceleration, a turn, a lane switch, a veer to a shoulder, and so forth) for the vehicle to perform different from that of the initially planned trajectory. The simplified secondary compute system may then instruct the vehicle to execute the altered planned trajectory. On the other hand, when the simplified secondary compute system determines the planned trajectory as satisfying the confidence threshold, the simplified secondary compute system may forgo altering the numerical measurement parameters and/or kinematic measurement parameters associated with the planned trajectory, and, instead, simply instruct the vehicle to execute the initially planned trajectory.

Thus, the present embodiments may provide an independent trajectory validation system including a simplified secondary compute system (e.g., a failsafe compute system) for independently validating the planned trajectory of the robust primary compute system in autonomous or semi-autonomous vehicles. The simplified secondary compute system may provide an independent validation of the robust primary compute system to ensure and maximize the safety of the autonomous or semi-autonomous vehicle. Indeed, because the simplified secondary compute system may ascertain the planned trajectory of the vehicle beforehand based on one or more numerical measurement parameters (e.g., vehicle velocity, vehicle steering angle, a vehicle acceleration, a vehicle positioning parameter, a vehicle throttle position, a vehicle torque, a vehicle fuel range, a vehicle charge range, a vehicle clutch engagement and/or disengagement, a vehicle driving mode, a vehicle air-to-fuel ratio, a vehicle altitude, or some combination thereof) associated with the planned trajectory, the simplified secondary compute system may rely upon less processing power, memory capacity, and data throughput as compared to the robust primary compute system. This may thus allow the simplified secondary compute system 204 to achieve faster response times (e.g., with respect to detecting the environmental conditions and also responding thereto) as compared to the robust primary compute system 202. Additionally, the one or more numerical measurement parameters and/or kinematic measurement parameters may themselves be less susceptible to interpretation, distortion, extended processing times, and overloading as opposed to more complex metrics and/or analytics. Moreover, by relying solely upon the numerical measurement parameters and/or kinematic measurement parameters, any possibility of discrepancy between the robust primary compute system and the simplified secondary compute system may be minimized, in that the simplified secondary compute system may take precedence over the robust primary compute system with respect to environmental condition detection or other object detection.

Indeed, while the present techniques may be discussed herein primarily with respect to independently validating the planned trajectory of a more robust primary compute system in response to a simplified secondary compute system detecting an object in the forward drive path of a vehicle, it should be appreciated that the independent trajectory validation techniques as disclosed herein may be applied in response to any of various detectable environmental conditions, such as objects (e.g., other vehicles, pedestrians, and cyclists) obstructing or partially obstructing the drive path of the vehicle, various weather and/or road conditions (e.g., wet road conditions, iced road conditions, road inclines, road declines, vehicle visibility range, and so forth), road and traffic communications (e.g., traffic lights, traffic signs, lane markings, lane boundaries, detours, school zones, railroad crossings, and so forth), among various other detectable environmental conditions.

With the forgoing in mind, it may be useful to describe an example trajectory generating and modeling system 100, as illustrated, for example, by FIG. 1. In certain embodiments, the trajectory generating and modeling system 100 may include, for example, a trajectory planning and decision-making model for a vehicle 102, for example, as the vehicle 102 navigates an environment 104 (e.g., urban environment, suburban environment, rural environment). For example, the trajectory generating and modeling system 100 may be utilized to determine a drive trajectory 106 by which the vehicle 102 may travel, for example, along a path 107 from an initial destination to a final destination within the environment 104. In certain embodiments, as further depicted by FIG. 1, the drive trajectory 106 may potentially pass through and/or nearby, for example, one or more environmental conditions 108.

In some embodiments, the one or more environmental conditions 108 may include any potential obstructions the vehicle 102 may encounter along the drive trajectory 106 and/or the path 107 including, for example, other vehicles, curbs, corners, debris, wildlife, vegetation, objects, or any of various other potential moving and/or stationary obstructions. In other embodiments, the one or more environmental conditions 108 may include various weather and/or road conditions (e.g., wet road conditions, iced road conditions, fog conditions, misty conditions, road inclines or declines, vehicle visibility range, and so forth), road and traffic communications (e.g., traffic lights, traffic signs, lane markings, lane boundaries, detours, school zones, railroad crossings, and so forth), among various other detectable environmental conditions 108 the vehicle 102 may encounter along the drive trajectory 106.

In certain embodiments, as further depicted by FIG. 1, the trajectory generating and modeling system 100 may include one or more system indicators or other display parameters, such as a vehicle system input parameter 110 (e.g., for providing or indicating autonomous and/or semi-autonomous vehicle 102 operation), a vehicle operator input parameter 112 (e.g., for providing or indicating driver-controlled vehicle 102 operation), a vehicle steering angle parameter 114, a vehicle velocity or acceleration parameter 116, and a traffic light or traffic sign parameter 118. In one embodiment, the vehicle steering angle parameter 114 may correspond to the planned steering angle of the vehicle 102 as the vehicle 102 travels along the drive trajectory 106. In another embodiment, the vehicle steering angle parameter 114 may correspond to the steering angle that the vehicle 102 is expected to achieve after some period of time (e.g., at a later point in the drive trajectory 106 or in response to the one or more environmental conditions 108).

Similarly, the vehicle velocity or acceleration parameter 116 may correspond to the planned velocity or acceleration of the vehicle 102 as the vehicle 102 travels along the drive trajectory 106, or, in other embodiments, to the velocity or acceleration that the vehicle 102 is expected to achieve after some period of time (e.g., at a later point in the drive trajectory 106 or in response to the one or more environmental conditions 108). The traffic light or traffic sign parameter 118 may indicate, for example, the current and/or the presumptive traffic and road information (e.g., red light vs green light, stop sign vs yield sign, red turn signal vs green turn signal, flashing red light 4-way stop, and so forth) as the vehicle 102 travels along the drive trajectory 106.

Figure 2A:
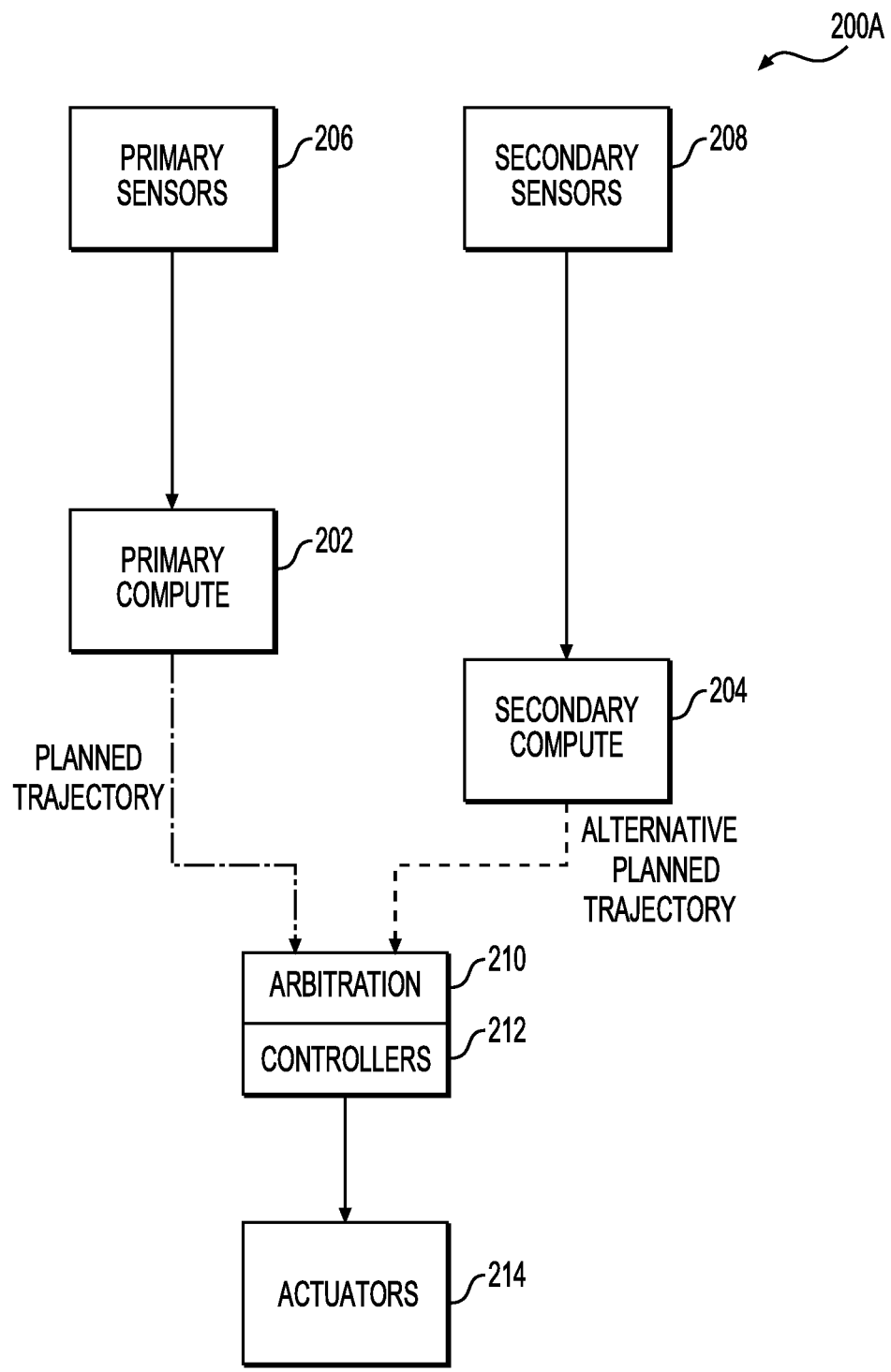
FIG. 2A illustrates an example embodiment of an independent trajectory validation system.

FIG. 2A illustrates an example embodiment of an independent trajectory validation system 200A, including a robust primary compute system 202 and a simplified secondary compute system 204, that may be provided for independently validating the planned trajectory of the robust primary compute system 202, in accordance with the presently disclosed embodiments. As depicted, in certain embodiments, the robust primary compute system 202 may receive inputs from one or more primary sensors 206. For example, in some embodiments, the primary sensors 206 may include, for example, one or more combinations of LiDAR sensors, cameras, radars, IMUs, or other similar sensor devices that may be utilized to capture or generate first sensor data (e.g., more complex and/or comprehensive 3D data) about the environment 104 surrounding the vehicle 102. For example, in certain embodiments, the robust primary compute system 202 may include one or more agent modelers (e.g., object detectors, object classifiers, or machine-learning models trained to derive information from the sensor data) to detect and/or classify agents present within the environment 104 (e.g., other vehicles, pedestrians, bicyclists, wildlife, vegetation, or any of various other potential moving and/or stationary obstructions). The robust primary compute system 202 may also determine various characteristics of the agents. For example, the robust primary compute system 202 may track the velocities, moving directions, accelerations, trajectories, relative distances, or relative positions of these agents. In some embodiments, the robust primary compute system 202 may also leverage information from a high-definition map, such as a precise 3D model of the environment, including buildings, curbs, street signs, traffic lights, and any stationary fixtures within the environment 104. In certain embodiments, the robust primary compute system 202 may also track the agents as the agents move within the environment 104 relative to the vehicle 102 In certain embodiments, the robust primary compute system 202 may also predict the behavior of agents nearby or surrounding the vehicle 102 within the environment 104 and determine a particular navigation path or trajectory based on the predicted behavior of agents.

In certain embodiments, the robust primary compute system 202 may then generate a planned trajectory (e.g., drive trajectory 106) to be provided to the one or more controllers 212 and associated actuators 214 based on the first sensor data captured or generated by the primary sensors 206. In certain embodiments, concurrently or near concurrently, the simplified secondary compute system 204 may receive secondary sensor data captured or generated by one or more secondary sensors 208 of the vehicle 102. For example, in some embodiments, the secondary sensors 208 may include one or more sensors that may include less complex and fewer sensors and predesignated sensors (e.g., image sensors, ultrasonic sensors, infrared sensors, RF sensors predesignated to perform only object detection as compared to the primary sensors 206 that may be provided in support of perception, classification, and prediction), such as one or more image sensors, ultrasonic sensors, infrared sensors, RF sensors, or other less complex or predesignated sensors that may be utilized to detect potential hazards in the environmental conditions 108 with respect to the vehicle 102 (e.g., independently of the primary sensors 206). For example, in one embodiment, the secondary sensors 208 corresponding to the simplified secondary compute system 204 may be provided to support only detection of potential hazards based on environmental conditions 108 within the environment 104 surrounding the vehicle 102, while the primary sensors 206 corresponding to the robust primary compute system 202 may be provided to support, for example, more complex operations, such as perception, classification, and prediction of one or more environmental conditions 108 within environment 104 surrounding the vehicle 102. In some embodiments, the simplified secondary compute system 204 may also rely upon, for example, one or more semantic maps to perform object detection and/or object localization.

For example, in certain embodiments, the secondary sensors 208, in conjunction with the simplified secondary compute system 204, may detect and determine a potential hazard based on environmental conditions 108 (e.g., an object obstructing or partially obstructing the drive trajectory 106 of the vehicle 102, potentially hazardous weather and/or road conditions, a road and traffic communication) that may not be detected by the primary sensors 206 and determined by the robust primary compute system 202. For example, in the instance in which the primary sensors 206 include one or more radar sensors relied upon by the robust primary compute system 202 for object detection, the radar sensors may be susceptible to becoming "dirty" due to, for example, certain atmospheric conditions (e.g., fog, dew, pollen, muddy or unsurfaced roads) and/or weather conditions (e.g., rainstorms, snowstorms, sandstorms, and so forth) the vehicle 102 may be subjected to during operation. Similarly, in other instances in which the primary sensors 206 include one or more particular cameras relied upon by the robust primary compute system 202 for determining red lights and/or stop signs, the cameras may be less precise when the vehicle 102 is operating during, for example, twilight or nightfall. Still, in an instance in which a highway detour within the environment 104 (e.g., urban environment) has been recently constructed, for example, certain maps generated and relied upon by the robust primary compute system 202 may not be immediately updated with respect to the recent detour within the environment 104, for example.

In certain embodiments, upon the simplified secondary compute system 204 determining that the robust primary compute system 202 failed to account for the potential hazard based on environmental conditions 108 in the generation of the planned trajectory (e.g., drive trajectory 106), the simplified secondary compute system 204 may then alter one or more numerical measurement parameters to generate an alternative planned trajectory for the vehicle 102, as will be described in reference to FIG. 2B.

In certain embodiments, the simplified secondary compute system 204 may then provide the alternative planned trajectory for the vehicle 102 to an arbitration system 210. For example, in some embodiments, the arbitration system 210 may include any system (e.g., one or more multiplexers (MUXs)) that may be utilized to arbitrate between instructing one or more controllers 212 to control one or more actuators 214 to perform the planned trajectory generated by the robust primary compute system 202 or the alternative planned trajectory generated by the simplified secondary compute system 204. Particularly, in certain embodiments, the arbitration system 210 may toggle between the planned trajectory generated by the robust primary compute system 202 and the alternative planned trajectory generated by the simplified secondary compute system 204 based on a hierarchy of trust that prioritizes and defers to the alternative planned trajectory generated by the simplified secondary compute system 204.

For example, anytime the arbitration system 210 receives an input of the alternative planned trajectory from the simplified secondary compute system 204, the arbitration system 210 may automatically instruct the one or more controllers 212 to cause the actuators 214 to perform the alternative planned trajectory generated by the simplified secondary compute system 204. Only when no input of the alternative planned trajectory is received from the simplified secondary compute system 204 does the arbitration system 210 instruct the one or more controllers 212 to cause the actuators 214 to perform the planned trajectory generated by the robust primary compute system 202. That is, the arbitration system 210 may default to instructing the one or more controllers 212 to control the one or more actuators 214 to cause to be performed the planned trajectory generated by the robust primary compute system 202 unless the arbitration system 210 otherwise receives the alternative planned trajectory generated by the simplified secondary compute system 204. For example, based on the instructions provided by the arbitration system 210, the one or more controllers 212 may then provide an output to one or more actuators 214 of the vehicle 102 to cause the vehicle 102 to operate in accordance with either the planned trajectory or the alternative planned trajectory.

Figure 2B:
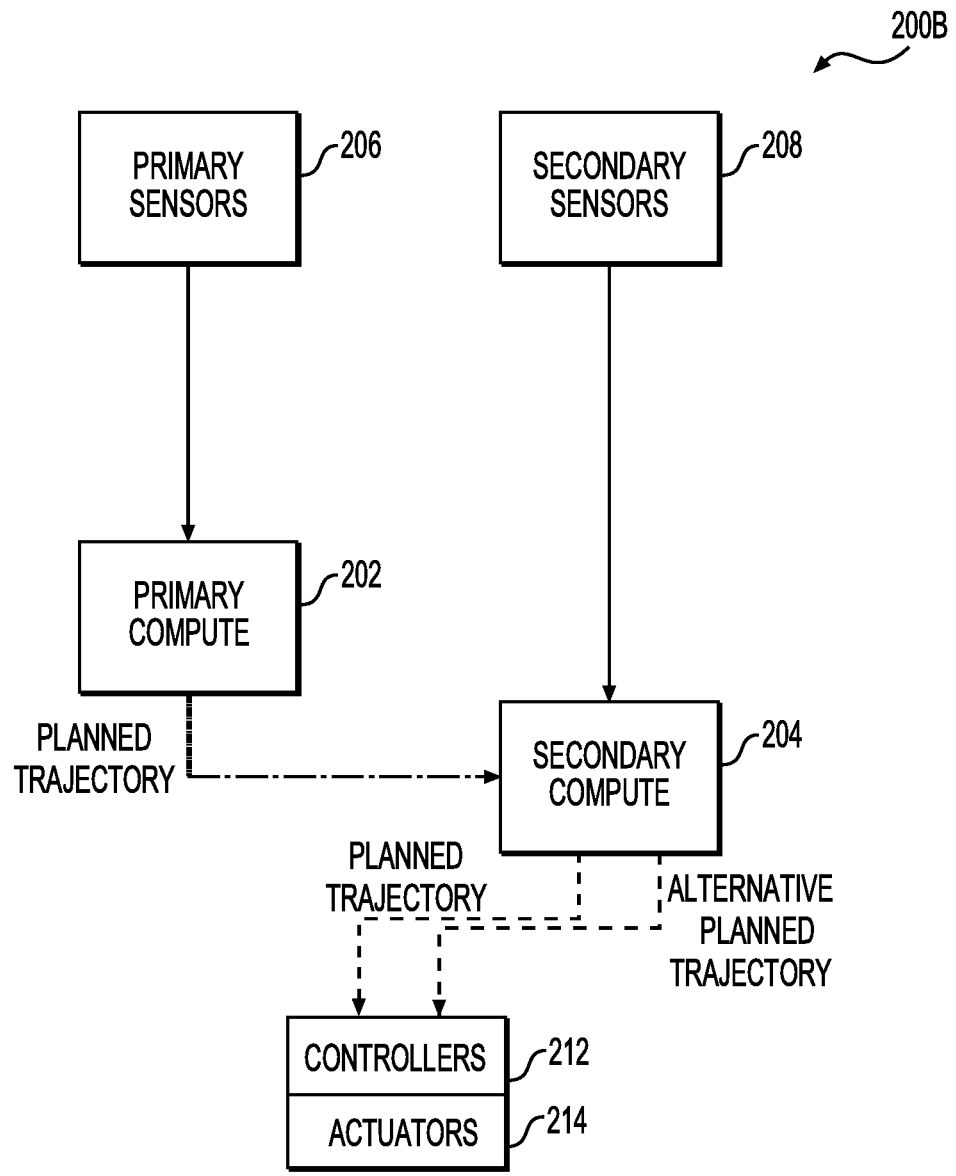
FIG. 2B illustrates another example embodiment of an independent trajectory validation system.

FIG. 2B illustrates another embodiment of the independent trajectory validation system 200B, including the robust primary compute system 202 and the simplified secondary compute system 204, that may be provided for independently validating the planned trajectory of the robust primary compute system 202, in accordance with the presently disclosed embodiments. As depicted, in certain embodiments, the robust primary compute system 202 may receive inputs from one or more primary sensors 206. For example, in some embodiments, as discussed above with respect to FIG. 2A, the primary sensors 206 may include, for example, one or more combinations of LiDAR sensors, cameras, radars, IMUs, or other similar sensor devices that may be utilized to capture or generate first sensor data (e.g., more complex and/or comprehensive 3D data) about the environment 104 surrounding the vehicle 102. In certain embodiments, the robust primary compute system 202 may generate a planned trajectory (e.g., drive trajectory 106) for the vehicle 102 based on the first sensor data captured or generated by the primary sensors 206.

In certain embodiments, concurrently or near concurrently, the simplified secondary compute system 204 may receive secondary sensor data captured or generated by one or more secondary sensors 208 of the vehicle 102. For example, in some embodiments, as previously discussed, the secondary sensors 208 may include one or more sensors that may include less complex and fewer sensors and predesignated sensors (e.g., image sensors, ultrasonic sensors, infrared sensors, RF sensors predesignated to perform only object detection as compared to the primary sensors 206 that may be provided in support of perception, classification, and prediction), such as one or more image sensors, ultrasonic sensors, infrared sensors, RF sensors, or other less complex or predesignated sensors that may be utilized to detect potential hazards in the environmental conditions 108 with respect to the vehicle 102 (e.g., independently of the primary sensors 206). For example, as previously noted above, the secondary sensors 208 corresponding to the simplified secondary compute system 204 may be provided to support only detection of potential hazards based on environmental conditions 108 within environment 104 surrounding the vehicle 102, while the primary sensors 206 corresponding to the robust primary compute system 202 may be provided to support, for example, more complex operations, such as perception, classification, and prediction of one or more environmental conditions 108 within environment 104 surrounding the vehicle 102.

For example, in certain embodiments, the secondary sensors 208 in conjunction with the simplified secondary compute system 204 may detect and determine a potential hazard based on environmental conditions 108 (e.g., an object obstructing or partially obstructing the drive trajectory 106 of the vehicle 102, potentially hazardous weather and/or road conditions, a road and traffic communication) that may not be detected by the primary sensors 206 and determined by the robust primary compute system 202. Thus, because the robust primary compute system 202 may rely upon the primary sensors 206 to generate a planned trajectory (e.g., drive trajectory 106) for the vehicle 102, it may be thus useful to validate the planned trajectory (e.g., drive trajectory 106) generated by the robust primary compute system 202 independently from the robust primary compute system 202 and the primary sensors 206. For example, in certain embodiments, after the secondary sensors 208 in conjunction with the simplified secondary compute system 204 may detect and determine a potential hazard based on environmental conditions 108, the simplified secondary compute system 204 may then analyze one or more numerical measurement parameters and/or kinematic measurement parameters associated with the planned trajectory (e.g., drive trajectory 106) generated by the robust primary compute system 202 to determine whether the planned trajectory (e.g., drive trajectory 106) accounts for the potential hazard based on environmental conditions 108. In some embodiments, the robust primary compute system 202 may continuously publish notifications (e.g., 10 or more times per second) to the simplified secondary compute system 204, thus allowing the simplified secondary compute system 204 continuously validate the planned trajectory generated by the robust primary compute system 202 throughout the duration in which the vehicle 102 travels along, for example, the drive trajectory 106 and/or the path 107.

For example, in some embodiments, the simplified secondary compute system 204 may analyze and ascertain the planned trajectory (e.g., drive trajectory 106) of the vehicle 102 (e.g., at least approximately 10-12 seconds before the vehicle 102 would otherwise encounter the potential hazard based on environmental conditions 108) based on numerical measurement parameters (e.g., vehicle 102 velocity, vehicle 102 steering angle, a vehicle 102 acceleration, a vehicle 102 positioning parameter, a vehicle 102 throttle position, a vehicle 102 torque, a vehicle 102 fuel range, a vehicle 102 charge range, a vehicle 102 clutch engagement and/or disengagement, a vehicle 102 driving mode, a vehicle 102 air-to-fuel ratio, a vehicle 102 altitude, and so forth) associated with the planned trajectory (e.g., drive trajectory 106). In one embodiment, to further reduce computational load and processing resources, the simplified secondary compute system 204 may rely solely upon vehicle 102 velocity, vehicle 102 steering angle, and/or other simple kinematic parameters analyze and ascertain the planned trajectory. This may thus allow the simplified secondary compute system 204 to achieve faster response times (e.g., with respect to detecting the environmental conditions 108 and also responding thereto) as compared to the robust primary compute system 202. Additionally, the one or more numerical measurement parameters and/or kinematic measurement parameters may themselves be less susceptible to interpretation, distortion, extended processing times, and overloading as opposed to more complex metrics and/or analytics.

In certain embodiments, upon the simplified secondary compute system 204 determining that the robust primary compute system 202 failed to account for the potential hazard based on environmental conditions 108 in the generation of the planned trajectory (e.g., drive trajectory 106), the simplified secondary compute system 204 may then alter one or more numerical measurement parameters (e.g., change of vehicle 102 velocity, change of vehicle 102 steering angle, change of vehicle 102 acceleration, change of vehicle 102 positioning, change of vehicle 102 throttle position, change of vehicle 102 torque, engage a disengage a clutch of the vehicle 102, change of vehicle 102 driving mode, and so forth) to generate an alternative planned trajectory for the vehicle 102 (e.g., such that the vehicle 102 may evade or avoid altogether the potential hazard based on environmental conditions 108). For example, in one embodiment, the alternative planned trajectory generated by the simplified secondary computing system 204 may include, for example, one or more alternative driving maneuvers (e.g., a yield, a complete stop, an abrupt stop, a moving stop, an acceleration, a turn, a lane switch, a veer to a shoulder, and so forth) the vehicle 102 may be instructed to perform in order for the vehicle 102 to evade or avoid altogether the potential hazard based on environmental conditions 108.

In certain embodiments, the simplified secondary compute system 204 may then arbitrate between instructing the one or more controllers 212 to control the one or more actuators 214 to cause to be performed the planned trajectory generated by the robust primary compute system 202 or the alternative planned trajectory generated by the simplified secondary compute system 204. Particularly, in certain embodiments, the simplified secondary compute system 204 may determine whether the planned trajectory generated by the robust primary compute system 202 satisfies a confidence threshold. For example, upon determining the planned trajectory generated by the robust primary compute system 202 fails to satisfy the confidence threshold, the simplified secondary compute system 204 may instruct the one or more controllers 212 to control the actuators 212 to cause to be performed the alternative planned trajectory generated by the simplified secondary compute system 204. On the other hand, upon determining the planned trajectory generated by the robust primary compute system 202 satisfies the confidence threshold, the simplified secondary compute system 204 may forgo instructing the one or more controllers 212 to control the one or more actuators 212 to cause to be performed the alternative planned trajectory generated by the simplified secondary compute system 204. Instead, the simplified secondary compute system 204 may instruct the one or more controllers 212 to control the one or more actuators 214 to cause to be performed the planned trajectory generated by the robust primary compute system 202 as initially intended. For example, based on the instructions provided by the simplified secondary compute system 204, the one or more controllers 212 may then provide an output to one or more actuators 214 of the vehicle 102 to cause the vehicle 102 to operate in accordance with either the planned trajectory or the alternative planned trajectory.

In certain embodiments, in addition to embodiments in which the detected environmental condition 108 corresponds to, for example, one or more objects within the drive path of the vehicle 102, the simplified secondary compute system 204 may also detect and respond to other environmental conditions 108. For example, as previously noted, certain environmental conditions 108 may be improperly classified (e.g., a yield sign may be misclassified as a stop sign, a stationary object may be misclassified as a moving object, a yellow traffic light may be misclassified as a red light, road debris may be misclassified as an active object such as a cyclist, and so forth) by the robust primary compute system due to, for example, one or more transient system occurrences, such as routine mapping updates, and/ or one environmental occurrences, such as morning fog, dreary mist, or other similar undesirable road conditions. In such a case, the simplified secondary compute system 204 may independently detect the misclassified environmental condition 108 (e.g., based on one or more secondary camera sensors) and generate alternative trajectory in response thereto. For example, in one embodiment, the robust primary compute system 202 may misclassify a red light as a green light or misclassify a yellow lane boundary as a white lane boundary, for example. Separately and independently of the robust primary compute system 202, the simplified secondary compute system 204 may determine correctly (e.g., based on one or more secondary camera sensors) that the red light is misclassified as green or the yellow lane boundary is misclassified as white, and thus generate an alternative trajectory that includes, for example, a stop or abrupt stop of the vehicle 102 in the case of the determined red light or a turn or a maintaining of 0° steering angle (e.g., to keep the vehicle 102 driving straight) in the case of the determined yellow lane boundary.

Figure 3:
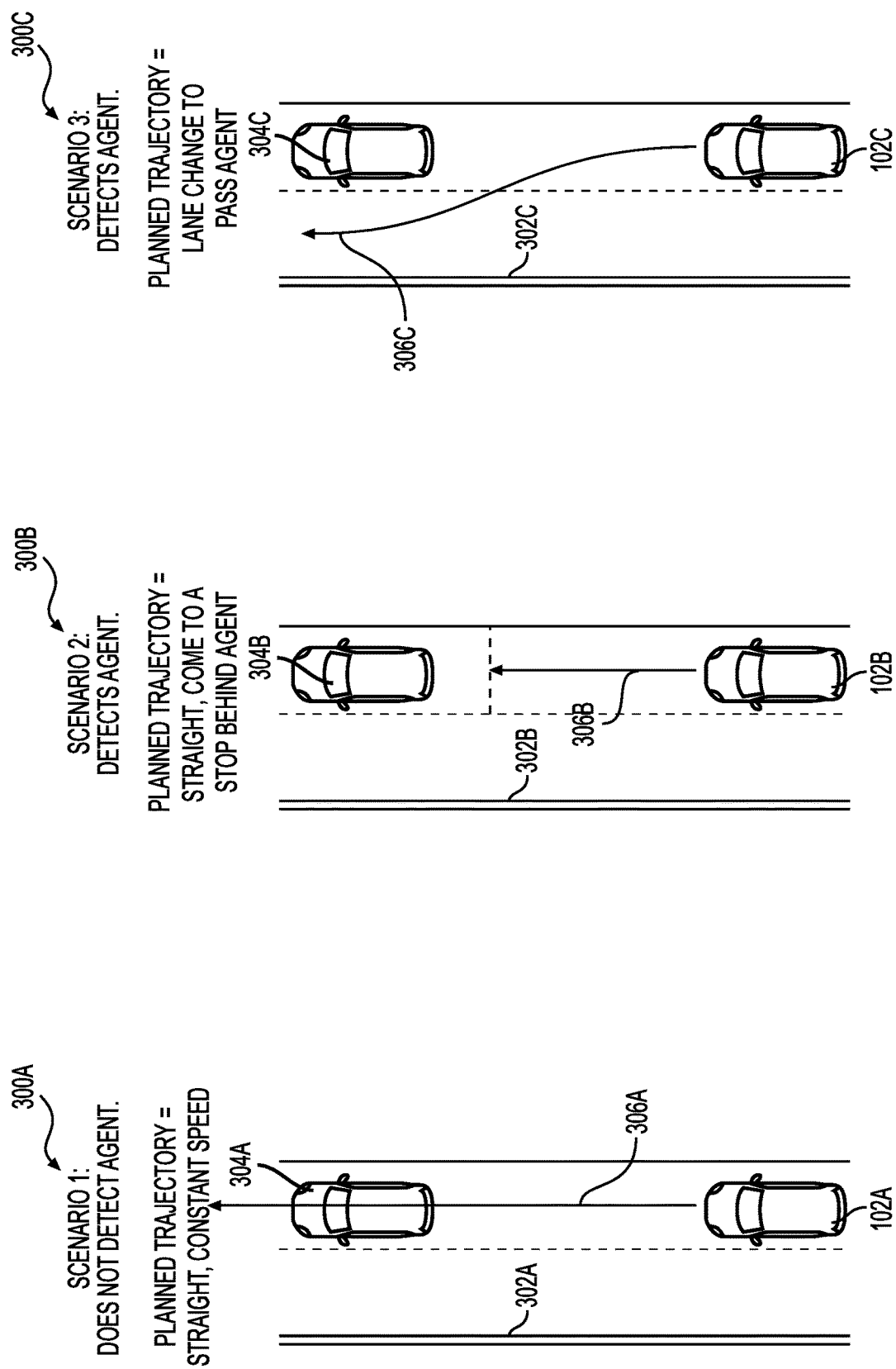
FIG. 3 illustrates one or more running examples for performing independent trajectory validation for autonomous or semi-autonomous vehicles.
Figure 4:
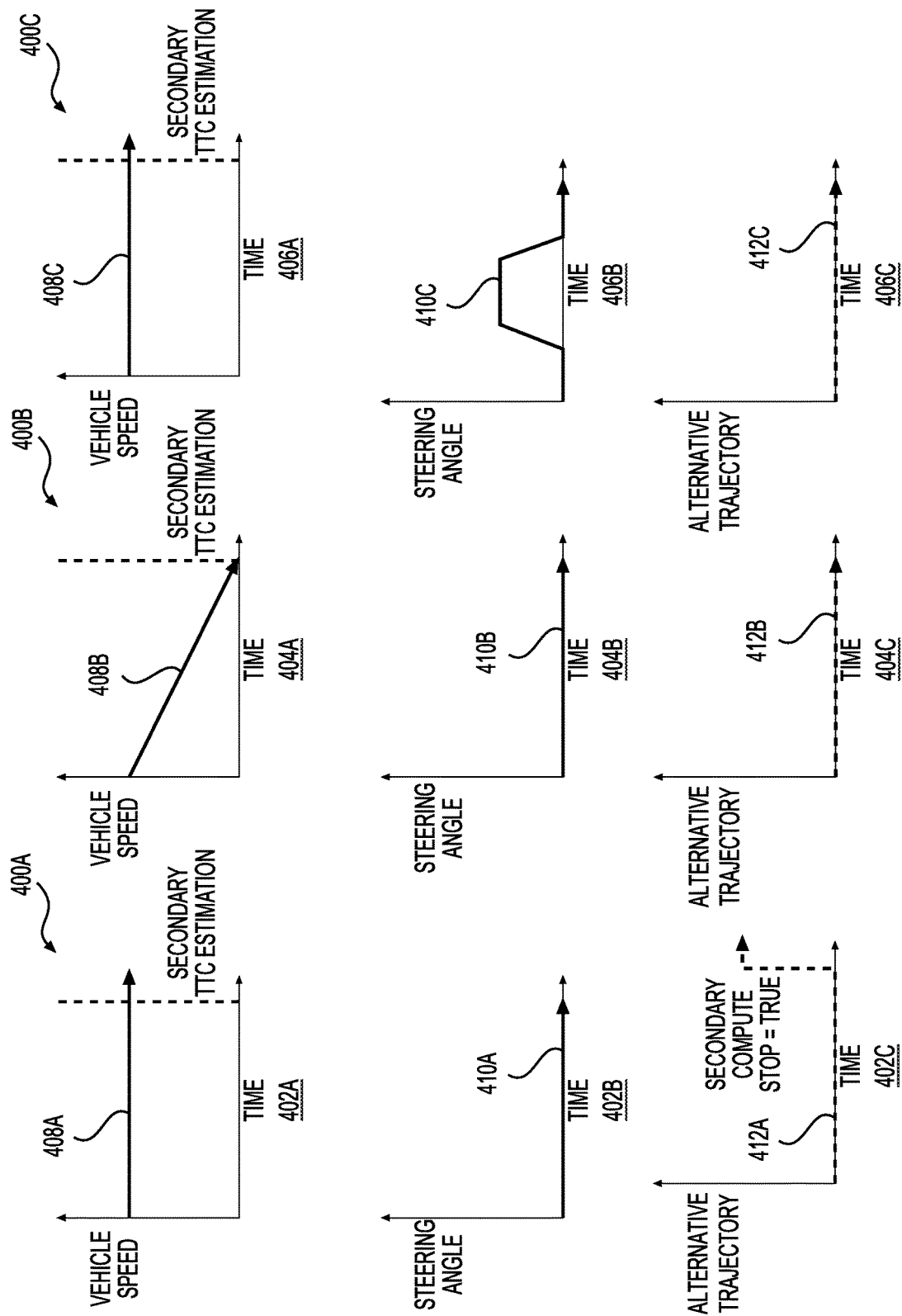
FIG. 4 illustrates one or more running examples for performing independent trajectory validation for autonomous or semi-autonomous vehicles.

FIGS. 3 and 4 illustrate one or more running examples for performing independent trajectory validation for autonomous or semi-autonomous vehicles, in accordance with the presently disclosed embodiments. For the purposes of illustration and conciseness, FIGS. 3 and 4 may be discussed herein in conjunction. It should be appreciated that the running examples provided by FIGS. 3 and 4 may represent only some examples of the presently disclosed embodiments. Indeed, while the running examples provided by FIGS. 3 and 4 may be discussed henceforth primarily with respect to object detection and avoidance, it should be appreciated that the independent trajectory validation techniques as presently disclosed herein may be applied in response to any of various detectable environmental conditions, such as objects (e.g., other vehicles, pedestrians, and cyclists) obstructing or partially obstructing the drive path of the vehicle, various weather and/or road conditions (e.g., wet road conditions, iced road conditions, road inclines, road declines, vehicle visibility range, and so forth), road and traffic communications (e.g., traffic lights, traffic signs, lane markings, lane boundaries, detours, school zones, railroad crossings, and so forth), among various other detectable environmental conditions.

Turning first to FIG. 3, example scenarios 300A, 300B, and 300C may be provided. Specifically, in briefly referring to FIG. 4, the example scenario 300A may correspond to independent trajectory validation example 400A, the example scenario 300B may correspond to independent trajectory validation example 400B, and the example scenario 300C may correspond to independent trajectory validation example 400C. For example, reverting back to FIG. 3, each of the example scenarios 300A, 300B, and 300C illustrates the present independent trajectory validation techniques for detecting other vehicles 304A, 304B, and 304C along a planned trajectory 306A, 306B, and 306C as the vehicles 102A, 102B, and 102C travel along roadways 302A, 302B, and 302C.

In the example scenario 300A, the robust primary compute system 202, for example, does not detect the other vehicle 304A, and, instead, the simplified secondary compute system 204, for example, detects the other vehicle 304A and independently validates the planned trajectory 306A (e.g., based on vehicle 102 velocity 408A and steering angle 410A). For example, turning forward again to trajectory validation example 400A of FIG. 4, a diagram 402A illustrates a constant velocity 408A through the time to collision (TTC) point and a diagram 402B illustrates a constant steering angle 410A through TTC. TTC is illustrated by the vertical dashed line of diagrams 402A, 402B, and 402C and may correspond to the point in time at which the vehicles 102A, 102B, and 102C would potentially collide with the other vehicles 304A, 304B, and 304C. In certain embodiments, TTC may be calculated by the simplified secondary compute system 204 based on, for example, the distance between the vehicles 102A, 102B, and 102C and the respective other vehicles 304A, 304B, and 304C and the currently velocity of the vehicles 102A, 102B, and 102C and the respective other vehicles 304A, 304B, and 304C. In another embodiment, TTC may be predicted by the simplified secondary compute system 204 based on, for example, a prediction of the travel trajectory of the respective other vehicles 304A, 304B, and 304C since the respective velocities of the other vehicles 304A, 304B, and 304C may be determined. Because both the velocity 408A and the steering angle 410A remain constant through TTC, the planned trajectory 306A generated by the robust primary compute system 202, for example, fails to satisfy the confidence threshold. Thus, the simplified secondary compute system 204, for example, may generate and provide an alternative trajectory 412A for the vehicle 102 (e.g., one or more driving maneuvers intended to cause the vehicle 102A to either stop before TCC or switch to the adjacent lane of the roadway 302A before TCC) as illustrated by the diagram 402C.

Turning back to FIG. 3, in the example scenario 300B, the robust primary compute system 202 detects the other vehicle 304B. The simplified secondary compute system 204 nevertheless independently validates the planned trajectory 306B (e.g., based on vehicle 102 velocity 408B and steering angle 410B). For example, turning forward again to trajectory validation example 400B of FIG. 4, a diagram 404A illustrates a decreasing velocity 408B before TTC and a diagram 404B illustrates a constant steering angle 410B through TCC. Because at least the velocity 408B decreases before TTC (e.g., indicating that the vehicle 102B will stop before TCC), the planned trajectory 306B generated by the robust primary compute system 202 satisfies the confidence threshold. Thus, the simplified secondary compute system 204 may forgo generating and providing an alternative trajectory 412B as illustrated by diagram 404C.

Turning back to FIG. 3, in the example scenario 300C, the robust primary compute system 202 detects the other vehicle 304C. The simplified secondary compute system 204 nevertheless independently validates the planned trajectory 306C (e.g., based on vehicle 102 velocity 408C and steering angle 410C). For example, turning forward again to trajectory validation example 400C of FIG. 4, a diagram 406A illustrates a constant velocity 408C through TTC and a diagram 406B illustrates a varied steering angle 410C before TCC. Because at least the steering angle 410C is varied before TTC (e.g., indicating that the vehicle 102C will turn or switch to the adjacent lane of the roadway 302C before TCC), the planned trajectory 306B generated by the robust primary compute system 202 satisfies the confidence threshold. Thus, the simplified secondary compute system 204 may forgo generating and providing an alternative trajectory 412C as illustrated by the diagram 406C.

Figure 5:
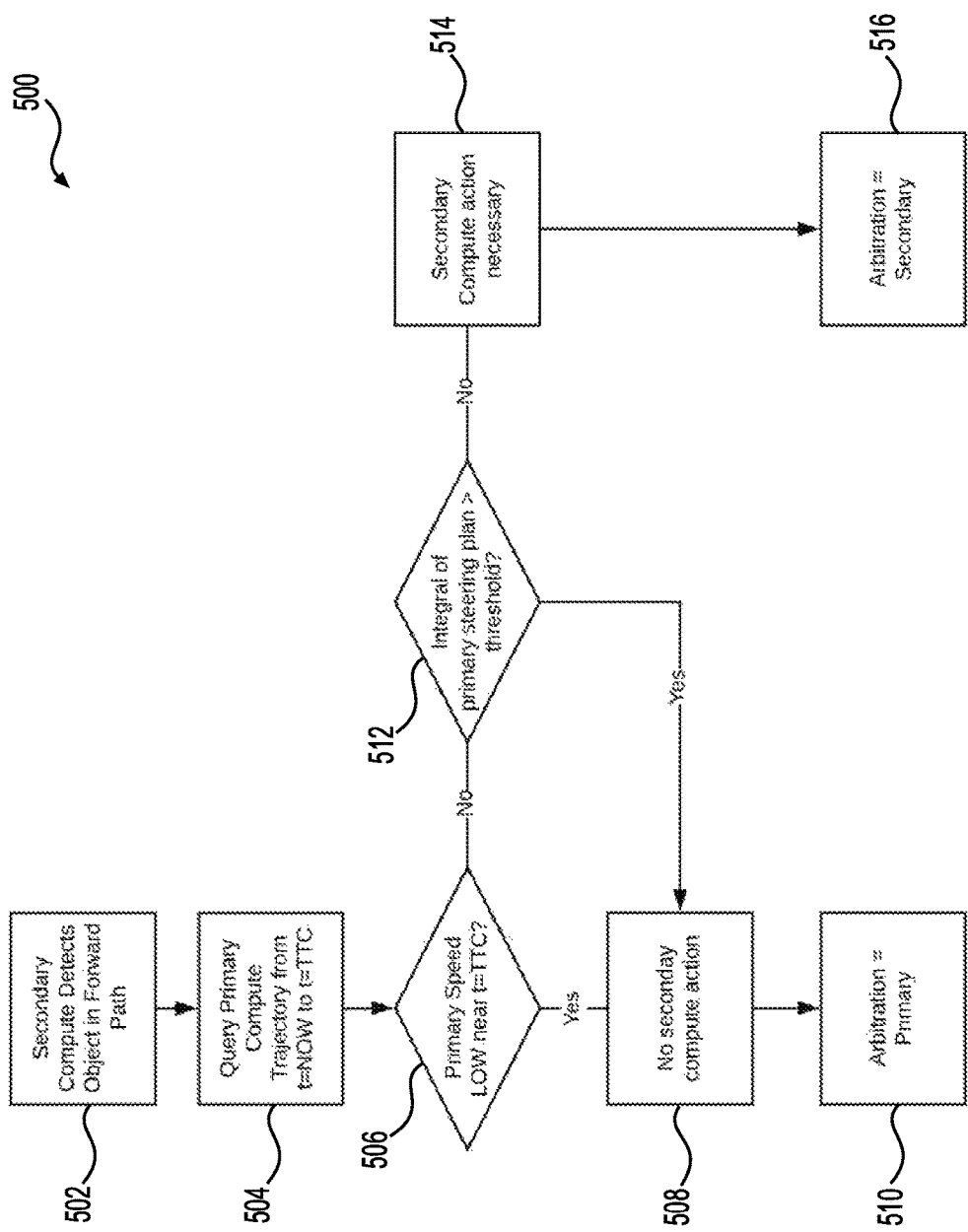
FIG. 5 illustrates a workflow diagram of a method for independently validating a planned trajectory by a secondary compute system of a vehicle.

FIG. 5 illustrates a workflow diagram 500 of a method for independently validating a planned trajectory by a simplified secondary compute system of a vehicle, in accordance with the presently disclosed embodiments. For example, in particular embodiments, the workflow diagram 500 may be performed by the simplified secondary compute system 204 may correspond to the running examples discussed and illustrated above with respect FIGS. 3 and 4. The workflow diagram 500 may begin at block 502 with the simplified secondary compute system 204 detecting one or more objects in the forward path of the vehicle 102. For example, the simplified secondary compute system 204 may receive secondary sensor data captured or generated by one or more secondary sensors 208 of the vehicle 102. The workflow diagram 500 may then continue at block 504 with the simplified secondary compute system 204 querying the planned trajectory generated by the robust primary compute system 202. For example, in response to detecting the object in the forward path of the vehicle 102, the secondary computing system 204 may then query the planned trajectory (e.g., drive trajectory 106) generated by the robust primary compute system 202 for the numerical measurement parameters and/or kinematic measurement parameters to determine (e.g., based on the numerical measurement parameters and/or kinematic measurement parameters) whether the planned trajectory (e.g., drive trajectory 106) is based at least in part on the object in the forward path of the vehicle 102. For example, in some embodiments, the simplified secondary compute system 204 may query the planned trajectory generated by the robust primary compute system 202 solely for vehicle 102 velocity, vehicle 102 steering angle, and/or other simple kinematic parameters.

The workflow diagram 500 may then continue at decision 506 with the simplified secondary compute system 204 determining whether the vehicle 102 velocity is "LOW" (e.g., nearing 0 mph) at the TCC. For example, as previously discussed above with respect to FIGS. 3 and 4, the simplified secondary compute system 204 may determine whether at least the velocity 408B, for example, decreases before TTC (e.g., indicating that the vehicle 102B will stop before TCC), to validate that the planned trajectory generated by the robust primary compute system 202 satisfies the confidence threshold. Thus, workflow diagram 500 may then continue at block 508 with the simplified secondary compute system 204 forgoing generating and providing an alternative trajectory generated by the simplified compute system, and, instead, may provide at block 510 the initially planned trajectory generated by the robust primary compute system 202. For example, the simplified secondary compute system 204 may provide the initially planned trajectory generated by the robust primary compute system 202 to the one or more controllers 212, which may then provide an output to the one or more actuators 214 of the vehicle 102 to cause the vehicle 102 to operate in accordance with the planned trajectory.

On the other hand, as previously discussed above with respect to FIGS. 3 and 4, if the simplified secondary compute system 204 determines a constant velocity 408C through TTC, the workflow diagram 500 may then continue at decision 512 with the simplified secondary compute system 204 determining whether the steering angle 410C is varied before TTC (e.g., indicating that the vehicle 102C will turn or switch to the adjacent lane of the roadway 302C before TCC) to validate the planned trajectory generated by the robust primary compute system 202 satisfies the confidence threshold. The workflow diagram 500 may then continue at block 508 with the simplified secondary compute system 204 forgoing generating and providing an alternative trajectory generated by the simplified secondary compute system 204, and, instead, may provide at block 510 the initially planned trajectory generated by the robust primary compute system 202. In certain embodiments, as further depicted by the workflow diagram 500, if the simplified secondary compute system 204 determines, for example, that both the velocity 408A and the steering angle 410A remain constant through TTC, the simplified secondary compute system 204 may determine that the planned trajectory generated by the robust primary compute system 202 fails to satisfy the confidence threshold. In this case, the workflow diagram 500 may continue at block 514 with the simplified secondary compute system 204 generating and providing at block 516 an alternative trajectory for (e.g., one or more driving maneuvers intended to cause the vehicle 102A to either stop before TCC or switch to the adjacent lane of the roadway 302A before TCC). For example, the simplified secondary compute system 204 may provide the alternative trajectory generated by the simplified secondary compute system 204 to the one or more controllers 212, which may then provide an output to the one or more actuators 214 of the vehicle 102 to cause the vehicle 102 to operate in accordance with the alternative trajectory.

Thus, the present embodiments may provide a secondary compute system 204 (e.g., a failsafe compute system) for independently validating the planned trajectory of the robust primary compute system 202 for the vehicle 102. The simplified secondary compute system 204 may provide an independent validation of the robust primary compute system 202 to ensure and maximize the safety of the vehicle 102. Indeed, because the simplified secondary compute system 204 may ascertain the planned trajectory of the vehicle 102 beforehand based on one or more numerical measurement parameters (e.g., vehicle 102 velocity, vehicle 102 steering angle, a vehicle 102 acceleration, a vehicle 102 positioning parameter, a vehicle 102 throttle position, a vehicle 102 torque, a vehicle 102 fuel range, a vehicle 102 charge range, a vehicle 102 clutch engagement and/or disengagement, a vehicle 102 driving mode, a vehicle 102 air-to-fuel ratio, a vehicle 102 altitude, or some combination thereof) associated with the planned trajectory, the simplified secondary compute system 204 may rely upon less processing power, memory capacity, and data throughput as compared to the robust primary compute system 202. This may thus allow the simplified secondary compute system 204 to achieve faster response times (e.g., with respect to detecting the environmental conditions 108 and also responding thereto) as compared to the robust primary compute system 202. Additionally, the one or more numerical measurement parameters and/or kinematic measurement parameters may themselves be less susceptible to interpretation, distortion, extended processing times, and overloading as opposed to more complex metrics and/or analytics.

Figure 6:
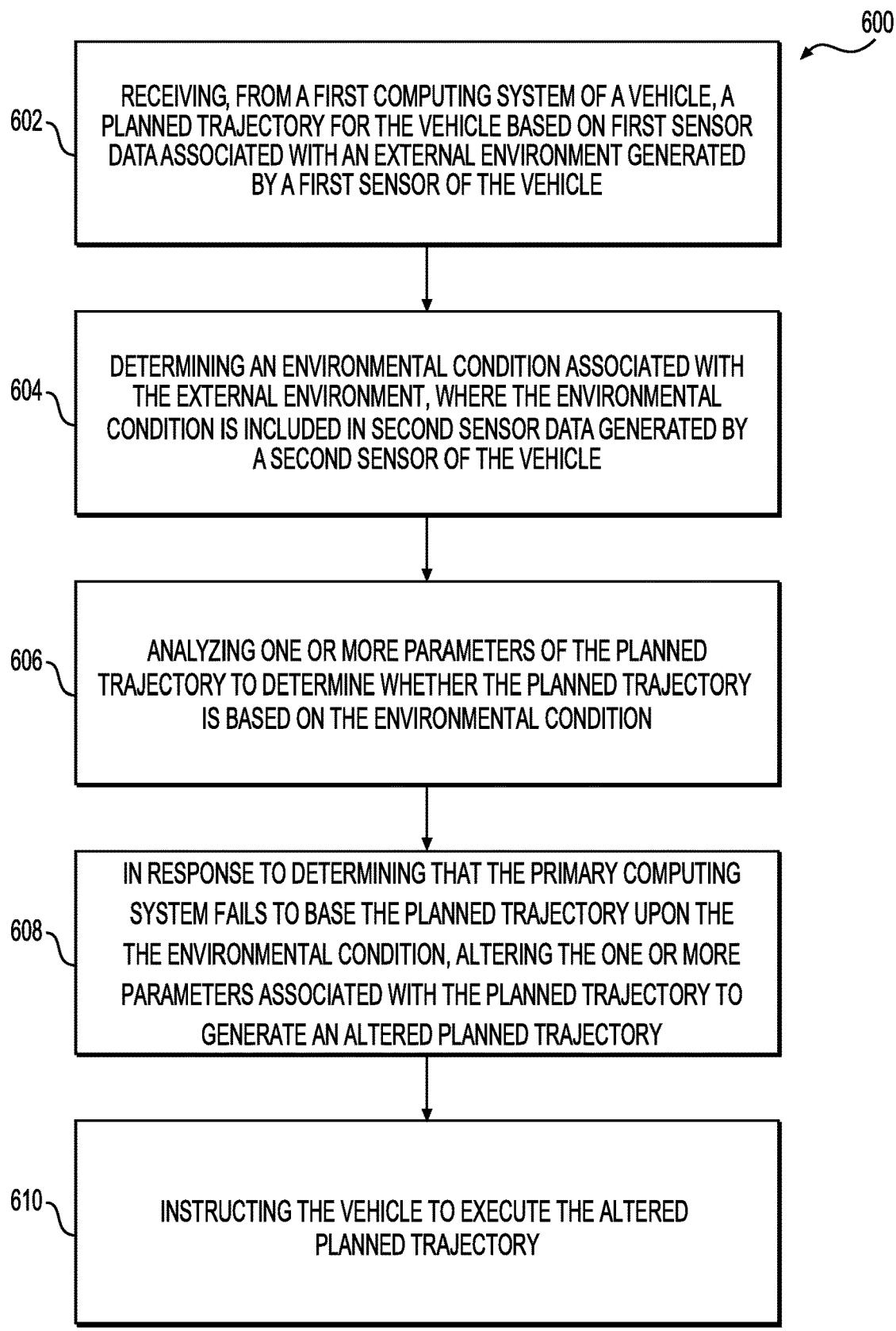
FIG. 6 illustrates a flow diagram of a method for independently validating a planned trajectory.

FIG. 6 is a flow diagram of a method 600 for independently validating a planned trajectory, in accordance with the presently disclosed embodiments. The method 600 may be performed utilizing one or more processors (e.g., second compute system 204) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing data), software (e.g., instructions running/executing on one or more processors), firmware (e.g., microcode), or any combination thereof.

The method 600 may begin at block 602 with one or more processors (e.g., secondary compute system 204) receiving from a primary computing system of a vehicle a planned trajectory for the vehicle based on first sensor data associated with an external environment generated by a first sensor of the vehicle. For example, in some embodiments, the secondary compute system 204 may receive a planned trajectory (e.g., drive trajectory 206) generated by the robust primary compute system 202 based on primary sensor 206 data generated or captured by the primary sensors 206. The method 600 may then continue at block 604 with the one or more processors (e.g., secondary compute system 204) determining an environmental condition associated with the external environment, in which the environmental condition may be included in second sensor data generated by second sensors of the vehicle. For example, in some embodiments, the secondary compute system 204 may determine an environmental condition (e.g., objects obstructing or partially obstructing the drive path of the vehicle 102, various weather and/or road conditions, road and traffic communications, and so forth) based on data received from received from the secondary sensors 208. Specifically, the simplified secondary compute system 204 may receive secondary sensor data generated by the secondary sensors 208 of the vehicle 102. Specifically, in some embodiments, the secondary sensors 208 may include one or more sensors that may be less complex and fewer in number and predesignated sensors (e.g., image sensors, ultrasonic sensors, infrared sensors, RF sensors predesignated to perform only object detection as compared to the primary sensors 206 that may be provided in support of perception, classification, and prediction) that may be utilized to detect potential hazards based on environmental conditions 108 with respect to the vehicle 102 and independently of the more complex primary sensors 206.

The method 600 may then continue at block 606 with the one or more processors (e.g., secondary compute system 204) analyzing one or more parameters associated with the planned trajectory to determine whether the planned trajectory is based on the environmental condition. For example, the secondary compute system 204 may analyze and ascertain the planned trajectory (e.g., drive trajectory 106) of the vehicle 102 based on one or more numerical measurement parameters (e.g., vehicle velocity, vehicle steering angle, a vehicle acceleration, a vehicle positioning parameter, a vehicle throttle position, a vehicle torque, a vehicle fuel range, a vehicle charge range, a vehicle clutch engagement and/or disengagement, a vehicle driving mode, a vehicle air-to-fuel ratio, a vehicle altitude, and so forth) associated with the initially planned trajectory (e.g., drive trajectory 106).

The method 600 may then continue at block 608 with the one or more processors (e.g., secondary compute system 204), in response to determining from the secondary computing system that the primary computing system fails to base the planned trajectory upon the environmental condition, altering the one or more parameters associated with the planned trajectory to generate an altered planned trajectory. For example, in response to detecting potential hazards based on environmental conditions 108, the secondary computing system 204 may query the planned trajectory (e.g., drive trajectory 106) for the numerical measurement parameters and/or kinematic measurement parameters to determine (e.g., based on the numerical measurement parameters and/or kinematic measurement parameters) whether the planned trajectory (e.g., drive trajectory 106) satisfies a confidence threshold. When the planned trajectory is determined as failing to satisfy the confidence threshold, the secondary computing system 204 may then alter the one or more numerical measurement parameters associated with the planned trajectory (e.g., drive trajectory 106) to generate an altered planned trajectory. The method 600 may then conclude at block 610 with the one or more processors (e.g., secondary compute system 204) instructing the vehicle to execute the altered planned trajectory.

Thus, the present embodiments may provide a secondary compute system 204 (e.g., a failsafe compute system) for independently validating the planned trajectory of the robust primary compute system 202 for the vehicle 102. The simplified secondary compute system 204 may provide an independent validation of the robust primary compute system 202 to ensure and maximize the safety of the vehicle 102. Indeed, because the simplified secondary compute system 204 may ascertain the planned trajectory of the vehicle 102 beforehand based on one or more numerical measurement parameters (e.g., vehicle 102 velocity, vehicle 102 steering angle, a vehicle 102 acceleration, a vehicle 102 positioning parameter, a vehicle 102 throttle position, a vehicle 102 torque, a vehicle 102 fuel range, a vehicle 102 charge range, a vehicle 102 clutch engagement and/or disengagement, a vehicle 102 driving mode, a vehicle 102 air-to-fuel ratio, a vehicle 102 altitude, or some combination thereof) associated with the planned trajectory, the simplified secondary compute system 204 may rely upon less processing power, memory capacity, and data throughput as compared to the robust primary compute system 202. This may thus allow the simplified secondary compute system 204 to achieve faster response times (e.g., with respect to detecting the environmental conditions 108 and also responding thereto) as compared to the robust primary compute system 202. Additionally, the one or more numerical measurement parameters and/or kinematic measurement parameters may themselves be less susceptible to interpretation, distortion, extended processing times, and overloading as opposed to more complex metrics and/or analytics. Moreover, by relying solely upon the numerical measurement parameters and/or kinematic measurement parameters, any possibility of discrepancy between the robust primary compute system 202 and the simplified secondary compute system 204 may be minimized, in that the simplified secondary compute system 204 may take precedence over the robust primary compute system 202 with respect to environmental condition 108 detection or other object detection.

Figure 7:
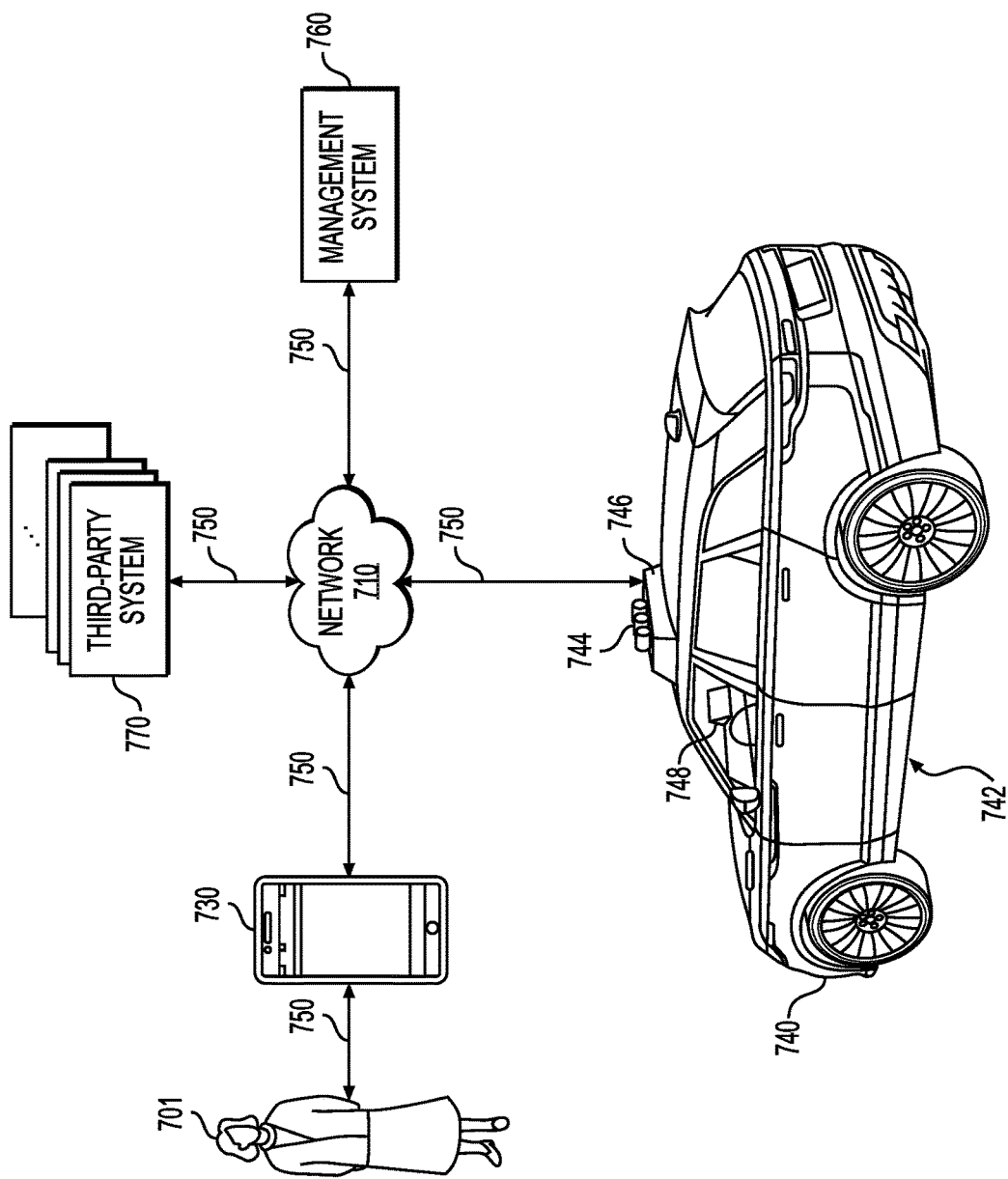
FIG. 7 illustrates an example block diagram of a transportation management environment for testing and validating autonomous or semi-autonomous vehicle driving systems.

FIG. 7 illustrates an example block diagram of a transportation management environment that may be utilized to perform one or more of the forgoing embodiments as discussed herein. In certain embodiments, the environment may include various computing entities, such as a user computing device 730 of a user 701 (e.g., a ride provider or requestor), a transportation management system 760, an autonomous or semi-autonomous vehicle 740, and one or more third-party system 770. The computing entities may be communicatively connected over any suitable network 710. As an example, and not by way of limitation, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In certain embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. As an example, and not by way of limitation, the network environment may include multiple users 701, user devices 730, transportation management system 760, autonomous or semi-autonomous vehicles 740, third-party systems 770, and networks 710.

The user device 730, transportation management system 760, autonomous or semi-autonomous vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, etc.), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP).

FIG. 7 illustrates transmission links 750 that connect user device 730, autonomous or semi-autonomous vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In certain embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities may not necessarily use the same type of transmission link 750. For example, the user device 730 may communicate with the transportation management system via a cellular network and the Internet but communicate with the autonomous vehicle 740 via Bluetooth or a physical wire connection.

In certain embodiments, the transportation management system 760 may fulfill ride requests for one or more users 701 by dispatching suitable vehicles. The transportation management system 760 may receive any number of ride requests from any number of ride requestors 701. In certain embodiments, a ride request from a ride requestor 701 may include an identifier that identifies the ride requestor in the system 760. The transportation management system 760 may use the identifier to access and store the ride requestor's 701 information, in accordance with the requestor's 701 privacy settings. The ride requestor's 701 information may be stored in one or more data stores (e.g., a relational database system) associated with and accessible to the transportation management system 760. In certain embodiments, ride requestor information may include profile information about a particular ride requestor 701.

In certain embodiments, the ride requestor 701 may be associated with one or more categories or types, through which the ride requestor 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when traveling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In certain embodiments, the transportation management system 760 may classify a user 701 based on known information about the user 701 (e.g., using machine-learning classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. As an example, and not by way of limitation, when the transportation management system 760 receives a request to travel from San Francisco International Airport (SFO) to Palo Alto, Calif., the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride.

In certain embodiments, portions of the ride information may be based on historical data associated with historical rides facilitated by the system 760. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 760.

For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc.

As yet another example, historical data associated with all users may include general usage trends, such as traffic and ride patterns. Using historical data, the system 760 in certain embodiments may predict and provide ride suggestions in response to a ride request. In certain embodiments, the system 760 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In certain embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In certain embodiments, each server may include hardware, software, or embedded logic components or a combination of two or more such components for carrying out the appropriate functionalities implemented or supported by the server.

In certain embodiments, transportation management system 760 may include one or more data stores. The data stores may be used to store various types of information, such as ride information, ride requestor information, ride provider information, historical information, third-party information, or any other suitable type of information. In certain embodiments, the information stored in the data stores may be organized according to specific data structures. In certain embodiments, each data store may be a relational, columnar, correlation, or any other suitable type of database system. Although this disclosure describes or illustrates particular types of databases, this disclosure contemplates any suitable types of databases. Certain embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In certain embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In certain embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In certain embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-party system 770 via network 710, or via transportation management system 760. In the latter case, if credentials are to be accessed the third-party system 770, the user 701 may provide such information to the transportation management system 760, which may serve as a proxy for accessing content from the third-party system 770.

In certain embodiments, user device 730 may be a mobile computing device such as a smartphone, tablet computer, or laptop computer. User device 730 may include one or more processors (e.g., CPU and/or GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and/or 2G/3G/4G/LTE/5G mobile communication standard. User device 730 may also include one or more cameras, scanners, touchscreens, microphones, speakers, and any other suitable input-output devices.

In certain embodiments, the vehicle 740 may be an autonomous or semi-autonomous vehicle and equipped with one or more actuators 742, an array of sensors 744, a navigation system 746, and a ride-service computing device 748. In certain embodiments, a fleet of autonomous or semi-autonomous vehicles 740 may be managed by the transportation management system 760. The fleet of autonomous vehicles 740, in whole or in part, may be owned by the entity associated with the transportation management system 760, or they may be owned by a third-party entity relative to the transportation management system 760. In either case, the transportation management system 760 may control the operations of the autonomous vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes) or other mechanical or physical operations that may be caused to be perform via the one or more actuators 742.

In certain embodiments, the autonomous or semi-autonomous vehicles 740 may receive data from and transmit data to the transportation management system 760 and the third-party system 770. Example of received data may include, e.g., instructions, new software or software updates, maps, 3D models, trained or untrained machine-learning models, location information (e.g., location of the ride requestor, the autonomous or semi-autonomous vehicle 740 itself, other vehicles 740, and target destinations such as service centers), navigation information, traffic information, weather information, entertainment content (e.g., music, video, and news) ride requestor information, ride information, and any other suitable information. Examples of data transmitted from the autonomous or semi-autonomous vehicle 740 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 740, passengers may send/receive data to the transportation management system 760 and/or third-party system 770), and any other suitable data.

In certain embodiments, autonomous or semi-autonomous vehicles 740 may also communicate with each other as well as other traditional human-driven vehicles, including those managed and not managed by the transportation management system 760. For example, one vehicle 740 may communicate with another vehicle data regarding their respective location, condition, status, sensor reading, and any other suitable information. In certain embodiments, vehicle-to-vehicle communication may take place over direct short-range wireless connection (e.g., WI-FI, Bluetooth, NFC) and/or over a network (e.g., the Internet or via the transportation management system 760 or third-party system 770).

In certain embodiments, an autonomous or semi-autonomous vehicle 740 may obtain and process sensor/telemetry data. Such data may be captured by any suitable sensors. For example, the vehicle 740 may have a LiDAR sensor array of multiple LiDAR transceivers that are configured to rotate 360°, emitting pulsed laser light and measuring the reflected light from objects surrounding vehicle 740. In certain embodiments, LiDAR transmitting signals may be steered by use of a gated light valve, which may be a MEMs device that directs a light beam using the principle of light diffraction. Such a device may not use a gimbaled mirror to steer light beams in 360° around the autonomous or semi-autonomous vehicle. Rather, the gated light valve may direct the light beam into one of several optical fibers, which may be arranged such that the light beam may be directed to many discrete positions around the autonomous or semi-autonomous vehicle. Thus, data may be captured in 360° around the autonomous or semi-autonomous vehicle, but no rotating parts may be necessary. A LiDAR is an effective sensor for measuring distances to targets, and as such may be used to generate a 3D model of the external environment of the autonomous or semi-autonomous vehicle 740. As an example, and not by way of limitation, the 3D model may represent the external environment including objects such as other cars, curbs, debris, objects, and pedestrians up to a maximum range of the sensor arrangement (e.g., 50 meters, 100 meters, or 200 meters).

As another example, the autonomous or semi-autonomous vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In certain embodiments, the vehicle may be equipped with stereo vision for, e.g., spotting hazards such as pedestrians or tree branches on the road. As another example, the vehicle 740 may have radars for, e.g., detecting other vehicles and/or hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection.

While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on autonomous vehicle 740 in FIG. 7, sensors 744 may be located in any suitable location in or on the autonomous or semi-autonomous vehicle 740. Example locations for sensors include the front and rear bumpers, the doors, the front windshield, on the side panel, or any other suitable location.

In certain embodiments, the autonomous vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest. In certain embodiments, the autonomous vehicle 740 may have a navigation system 746 responsible for safely navigating the autonomous vehicle 740. In certain embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, etc.). In certain embodiments, the navigation system 746 may use its determinations to control the vehicle 740 to operate in prescribed manners and to guide the autonomous vehicle 740 to its destinations without colliding into other objects. Although the physical embodiment of the navigation system 746 (e.g., the processing unit) appears in a particular location on autonomous vehicle 740 in FIG. 7, navigation system 746 may be located in any suitable location in or on autonomous vehicle 740. Example locations for navigation system 746 include inside the cabin or passenger compartment of autonomous vehicle 740, near the engine/battery, near the front seats, rear seats, or in any other suitable location.

In certain embodiments, the autonomous or semi-autonomous vehicle 740 may be equipped with a ride-service computing device 748, which may be a tablet computer, or any other suitable device installed by transportation management system 760 to allow the user to interact with the autonomous vehicle 740, transportation management system 760, other users 701, or third-party systems 770. In certain embodiments, installation of ride-service computing device 748 may be accomplished by placing the ride-service computing device 748 inside autonomous vehicle 740, and further configuring it to communicate with the vehicle 740 via a wire or wireless connection (e.g., via Bluetooth). Although FIG. 7 illustrates a single ride-service computing device 748 at a particular location in autonomous vehicle 740, autonomous or semi-autonomous vehicle 740 may include several ride-service computing devices 748 in several different locations within the vehicle.

As an example, and not by way of limitation, the autonomous or semi-autonomous vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In certain embodiments, ride-service computing device 748 may be detachable from any component of autonomous vehicle 740. This may allow users to handle ride-service computing device 748 in a manner consistent with other tablet computing devices. As an example, and not by way of limitation, a user may move ride-service computing device 748 to any location in the cabin or passenger compartment of the autonomous or semi-autonomous vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
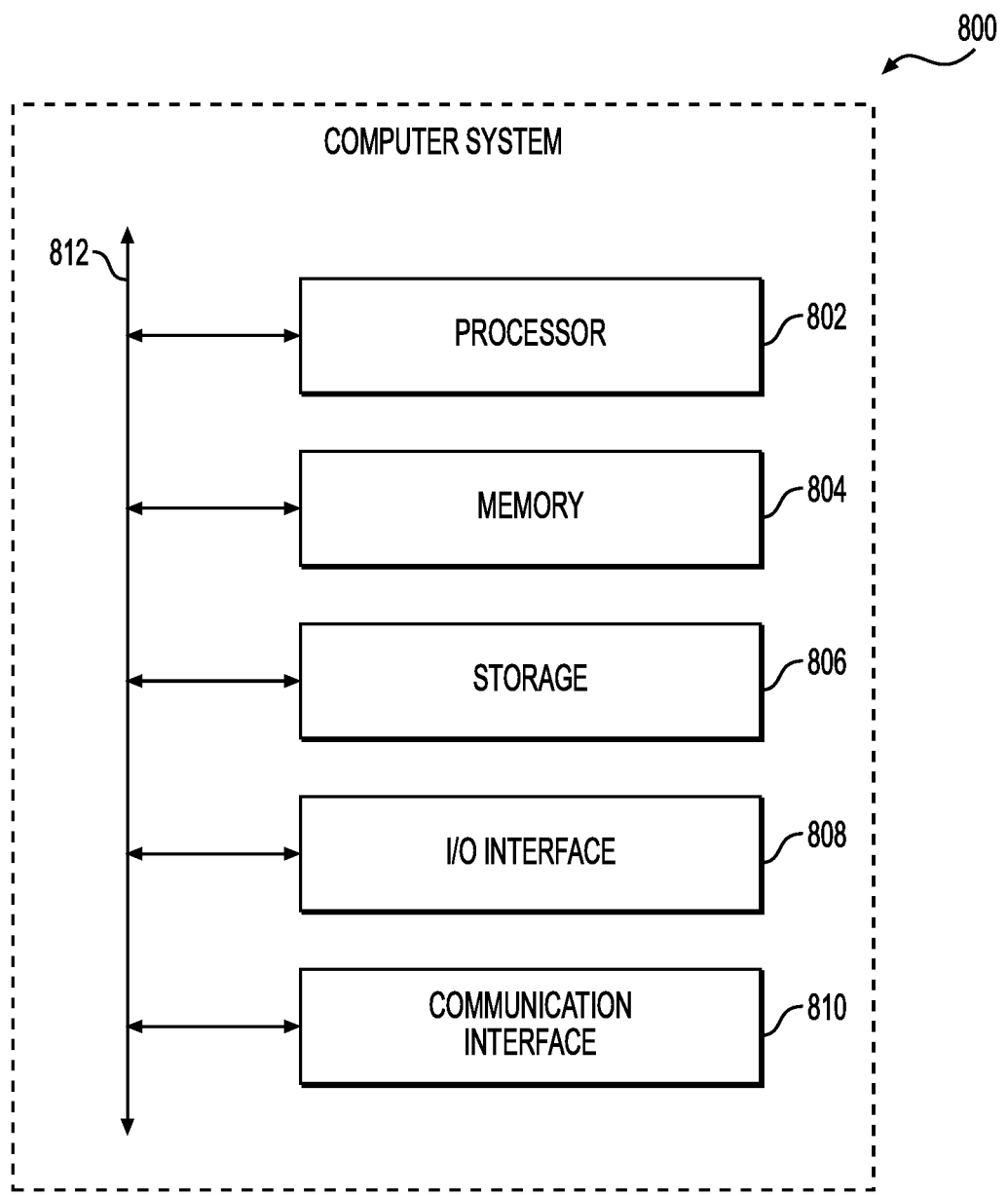
FIG. 8 illustrates an example computer system.

FIG. 8 illustrates an example computer system 800 that may be utilized to perform one or more of the forgoing embodiments as discussed herein. In certain embodiments, one or more computer systems 800 perform one or more steps of one or more methods described or illustrated herein. In certain embodiments, one or more computer systems 800 provide the functionalities described or illustrated herein. In certain embodiments, software running on one or more computer systems 800 performs one or more steps of one or more methods described or illustrated herein or provides the functionalities described or illustrated herein. Certain embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In certain embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement. In certain embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In certain embodiments, processor 802 may include one or more internal caches for data, instructions, or addresses.

This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In certain embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In certain embodiments, memory 804 includes main memory for storing instructions for processor 802 to execute or data for processor 802 to operate on. As an example, and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804.

In certain embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In certain embodiments, one or more memory management units (MMUs) reside between processor 802 and memory 804 and facilitate accesses to memory 804 requested by processor 802. In certain embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 704, where appropriate. Although this disclosure describes and illustrates particular memory, this disclosure contemplates any suitable memory.

In certain embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In certain embodiments, storage 806 is non-volatile, solid-state memory. In certain embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 706. Although this disclosure describes and illustrates particular storage, this disclosure contemplates any suitable storage.

In certain embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In certain embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In certain embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method comprising:
   receiving, by a computing system of a vehicle, a planned trajectory for the vehicle based on first sensor data associated with an external environment, wherein the planned trajectory is generated by a primary computing system of the vehicle that is associated with a first sensor;
   determining, by the computing system, an environmental condition associated with the external environment, wherein the environmental condition is included in second sensor data generated by a second sensor associated with the computing system of the vehicle, the second sensor being less complex than the first sensor and independent from the first sensor;
   analyzing, by the computing system, one or more parameters associated with the planned trajectory to determine whether the planned trajectory is based at least in part on the environmental condition including querying the primary computing system about the environmental condition to determine a confidence threshold of the primary computing system about a presence of the environmental condition in relation to the planned trajectory provided from the primary computing system to the computing system;
   in response to determining, by the computing system, that the primary computing system fails to base the planned trajectory at least in part upon the environmental condition, altering the one or more parameters associated with the planned trajectory to generate an altered planned trajectory; and
   instructing, by the computing system, the vehicle to execute the altered planned trajectory.

2. The method of claim 1, further comprising:
   in response to determining, by the computing system, that the primary computing system bases the planned trajectory at least in part upon the environmental condition, such that a parameter of the planned trajectory satisfies a confidence threshold:
   instructing, by the computing system, the vehicle to execute the planned trajectory.

3. The method of claim 2, wherein determining, by the computing system, that the primary computing system fails to base the planned trajectory at least in part upon the environmental condition comprises determining, by the computing system, that the parameter of the planned trajectory fails to satisfy the confidence threshold.

4. The method of claim 1, further comprising providing, by the computing system, instructions to a controller associated with an actuator of the vehicle, wherein the instructions are in accordance with the altered planned trajectory.

5. The method of claim 1, wherein the primary computing system generates the planned trajectory by:
   identifying at least one agent present within the external environment, wherein the at least one agent is included in the first sensor data generated by the first sensor;
   classifying the at least one agent within the external environment;
   tracking the at least one agent within the external environment; and
   predicting a trajectory of the at least one agent within the external environment.

6. The method of claim 5, further comprising:
   identifying, by the computing system, the at least one agent associated with the external environment independently of the primary computing system, wherein the at least one agent is included in the second sensor data generated by the second sensor;
   analyzing, by the computing system, a set of numerical measurement parameters associated with the planned trajectory to determine whether the planned trajectory is based on the identified at least one agent; and
   in response to determining, by the computing system, that the primary computing system fails to base the planned trajectory upon the at least one agent, altering the set of numerical measurement parameters associated with the planned trajectory to generate a second altered planned trajectory.

7. The method of claim 1, wherein analyzing the one or more parameters associated with the planned trajectory comprises analyzing one or more of a velocity parameter, a steering angle parameter, an acceleration parameter, a positioning parameter, a throttle position parameter, a torque parameter, a fuel range parameter, a charge range parameter, a clutch engagement parameter, a driving mode parameter, an air-to-fuel ratio parameter, an altitude parameter, or some combination thereof.

8. The method of claim 7, wherein instructing the vehicle to execute the altered planned trajectory comprises instructing the vehicle to alter at least one of the velocity parameter, the steering angle parameter, the acceleration parameter, the positioning parameter, the throttle position parameter, the torque parameter, the fuel range parameter, the charge range parameter, the clutch engagement parameter, the driving mode parameter, the air-to-fuel ratio parameter, the altitude parameter, or some combination thereof.

9. The method of claim 1, wherein the second sensor is simplified with respect to the first sensor, in that the second sensor is configured for only detection of the environmental condition associated with the external environment and the first sensor is configured for perception, classification, and prediction of one or more environmental conditions associated with the external environment.

10. A computing system of a vehicle, comprising:
one or more non-transitory computer-readable storage media including instructions; and
one or more processors coupled to the one or more non-transitory computer-readable storage media, the one or more processors configured to execute the instructions to:
receive a planned trajectory for the vehicle based on first sensor data associated with an external environment, wherein the planned trajectory is generated by a primary computing system associated with a first sensor of the vehicle;
determine an environmental condition associated with the external environment, wherein the environmental condition is included in second sensor data generated by a second sensor associated with the computing system of the vehicle, the second sensor being less complex than the first sensor and independent from the first sensor;
analyze one or more parameters associated with the planned trajectory to determine whether the planned trajectory is based at least in part on the environmental condition including querying the primary computing system about the environmental condition to determine a confidence threshold of the primary computing system about a presence of the environmental condition in relation to the planned trajectory provided from the primary computing system to the computing system;
in response to determining that the primary computing system fails to base the planned trajectory at least in part upon the environmental condition, alter the one or more parameters associated with the planned trajectory to generate an altered planned trajectory; and
instruct the vehicle to execute the altered planned trajectory.

11. The computing system of claim 10, wherein the one or more processors are further configured to execute the instructions to:
in response to determining that the primary computing system bases the planned trajectory at least in part upon the environmental condition, such that a parameter of the planned trajectory satisfies a confidence threshold: instruct the vehicle to execute the planned trajectory.

12. The computing system of claim 11, wherein the primary computing system fails to base the planned trajectory at least in part upon the environmental condition when the parameter of the planned trajectory fails to satisfy the confidence threshold.

13. The computing system of claim 10, wherein the one or more processors are further configured to execute the instructions to provide operational instructions to a controller associated with an actuator of the vehicle, wherein the operational instructions are in accordance with the altered planned trajectory.

14. The computing system of claim 10, wherein the one or more processors are further configured to execute the instructions to:
identify at least one agent present within the external environment, wherein the at least one agent is included in the first sensor data generated by the first sensor;
classify the at least one agent within the external environment;
track the at least one agent within the external environment; and
predict a trajectory of the at least one agent within the external environment.

15. The computing system of claim 14, wherein the one or more processors are further configured to execute the instructions to:
identify the at least one agent associated with the external environment independently of the primary computing system, wherein the at least one agent is included in the second sensor data generated by the second sensor;
analyze a set of numerical measurement parameters associated with the planned trajectory to determine whether the planned trajectory is based on the identified at least one agent; and
in response to determining that the primary computing system fails to base the planned trajectory upon the at least one agent, alter the set of numerical measurement parameters associated with the planned trajectory to generate a second altered planned trajectory.

16. The computing system of claim 10, wherein the instructions to analyze the one or more parameters further comprise instructions to analyze one or more of a velocity parameter, a steering angle parameter, an acceleration parameter, a positioning parameter, a throttle position parameter, a torque parameter, a fuel range parameter, a charge range parameter, a clutch engagement parameter, a clutch disengagement parameter, a driving mode parameter, an air-to-fuel ratio parameter, an altitude parameter, or some combination thereof.

17. The computing system of claim 16, wherein the instructions to execute the planned trajectory further comprise instructions to alter at least one of the velocity parameter, the steering angle parameter, the acceleration parameter, the positioning parameter, the throttle position parameter, the torque parameter, the fuel range parameter, the charge range parameter, the clutch engagement parameter, the driving mode parameter, the air-to-fuel ratio parameter, the altitude parameter, or some combination thereof.

18. The computing system of claim 10, wherein the second sensor is simplified with respect to the first sensor, in that the second sensor is configured for only detection of the environmental condition associated with the external environment and the first sensor is configured for perception, classification, and prediction of one or more environmental conditions associated with the external environment.

19. A non-transitory computer-readable medium comprising instructions that, when executed by one or more processors of a computing system, cause the one or more processors to:
receive a planned trajectory for a vehicle based on first sensor data associated with an external environment, wherein the planned trajectory is generated by a primary computing system associated with a first sensor of the vehicle;
determine an environmental condition associated with the external environment, wherein the environmental condition is included in second sensor data generated by a second sensor associated with the computing system of the vehicle, the second sensor being less complex than the first sensor and independent from the first sensor;
analyze one or more parameters associated with the planned trajectory to determine whether the planned trajectory is based at least in part on the environmental condition including querying the primary computing system about the environmental condition to determine a confidence threshold of the primary computing system about a presence of the environmental condition in relation to the planned trajectory provided from the primary computing system to the computing system;
in response to determining that the primary computing system fails to base the planned trajectory at least in part upon the environmental condition, alter the one or more parameters associated with the planned trajectory to generate an altered planned trajectory; and
instruct the vehicle to execute the altered planned trajectory.

20. The non-transitory computer-readable medium of claim 19, wherein the instructions further instructions cause the one or more processors to:
in response to determining that the primary computing system bases the planned trajectory at least in part upon the environmental condition, such that a parameter of the planned trajectory satisfies a confidence threshold: instruct the vehicle to execute the planned trajectory.

* * * * *